(12) United States Patent
Solheim et al.

(10) Patent No.: US 7,590,153 B2
(45) Date of Patent: Sep. 15, 2009

(54) PROTOCOL INDEPENDENT SUB-RATE DEVICE

(75) Inventors: Alan G. Solheim, Kanata (CA); Colin Kelly, Ottawa (CA); Matthew Brown, Kanata (CA); Chris Knapton, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1163 days.

(21) Appl. No.: 10/349,939

(22) Filed: Jan. 24, 2003

(65) Prior Publication Data

US 2003/0133475 A1 Jul. 17, 2003

Related U.S. Application Data

(63) Continuation of application No. 09/307,812, filed on May 10, 1999, now Pat. No. 6,522,671.

(51) Int. Cl.
*H04J 3/02* (2006.01)
*H04J 3/04* (2006.01)
*G06F 11/00* (2006.01)

(52) U.S. Cl. ............... 370/538; 370/532; 370/235
(58) Field of Classification Search ............... 370/358
See application file for complete search history.

(56) References Cited

U.S. PATENT DOCUMENTS

| | | | | |
|---|---|---|---|---|
| 4,965,787 A | * | 10/1990 | Almond et al. | 370/466 |
| 5,311,505 A | * | 5/1994 | Antoine | 370/449 |
| 5,396,492 A | * | 3/1995 | Lien | 370/412 |
| 5,414,707 A | * | 5/1995 | Johnston et al. | 370/395.6 |
| 5,541,926 A | * | 7/1996 | Saito et al. | 370/474 |
| 5,623,493 A | * | 4/1997 | Kagemoto | 370/397 |
| 5,867,543 A | * | 2/1999 | Roberts et al. | 375/365 |
| 5,872,789 A | * | 2/1999 | Orleth et al. | 370/517 |
| 5,914,962 A | * | 6/1999 | Fimoff et al. | 370/538 |
| 5,959,677 A | * | 9/1999 | Date et al. | 375/240.01 |

(Continued)

FOREIGN PATENT DOCUMENTS

EP 0622918 A2 4/1994

(Continued)

*Primary Examiner*—Chi H Pham
*Assistant Examiner*—Warner Wong
(74) *Attorney, Agent, or Firm*—Jeffrey M. Measures; Borden Ladner Gervais LLP

(57) ABSTRACT

A protocol independent multiplexer is described that allows for multiple different protocols that operate at different bit rates to be combined and output in a format that may have yet another bit rate. The multiplexer includes a series of inputting devices that are each coupled to a respective buffering device, a mapping device coupled to each of the buffering devices, and an outputting device coupled to the mapping device. Each of the inputting devices receive an input optical signal and forwards recovered data information to the corresponding buffering device. The buffering devices store the data information and output to the mapping device, the outputting being controlled by the mapping device to ensure that the buffering devices remain approximately half full. The mapping device formats the data information into individual data units and outputs the data units to the outputting device which subsequently multiplexes the data units. One key advantage of this protocol independent multiplexer is that only one piece of hardware is required for the operation of numerous different protocols.

11 Claims, 9 Drawing Sheets

U.S. PATENT DOCUMENTS

| | | | |
|---|---|---|---|
| 6,047,000 A * | 4/2000 | Tsang et al. | 370/412 |
| 6,047,002 A * | 4/2000 | Hartmann et al. | 370/466 |
| 6,058,109 A * | 5/2000 | Lechleider | 370/352 |
| 6,307,836 B1 * | 10/2001 | Jones et al. | 370/230 |
| 6,356,546 B1 * | 3/2002 | Beshai | 370/358 |
| 6,430,715 B1 * | 8/2002 | Myers et al. | 714/704 |
| 6,452,933 B1 * | 9/2002 | Duffield et al. | 370/415 |
| 6,522,671 B1 * | 2/2003 | Solheim et al. | 370/535 |
| 6,556,593 B1 * | 4/2003 | Herkersdorf et al. | 370/532 |
| 6,556,640 B1 * | 4/2003 | Baba | 375/376 |
| 6,580,721 B1 * | 6/2003 | Beshai | 370/428 |
| 6,628,652 B1 * | 9/2003 | Chrin et al. | 370/386 |
| 6,636,529 B1 * | 10/2003 | Goodman et al. | 370/469 |
| 6,785,289 B1 * | 8/2004 | Ward et al. | 370/412 |
| 7,075,951 B1 * | 7/2006 | McClary | 370/528 |
| 7,257,117 B2 * | 8/2007 | Roberts et al. | 370/392 |
| 2003/0185155 A1 * | 10/2003 | Huang et al. | 370/235 |

FOREIGN PATENT DOCUMENTS

| | | | |
|---|---|---|---|
| EP | 0 862 272 B1 | 4/2007 | |
| JP | 406197120 A * | 7/1994 | 370/415 |

* cited by examiner

PROTOCOL INDEPENDENT SUB-RATE DEVICE

CROSS-REFERENCE TO OTHER APPLICATION

This application is a continuation of and claims priority from U.S. patent application Ser. No. 09/307,812 filed May 10, 1999 now U.S. Pat. No. 6,522,671.

FIELD OF THE INVENTION

This invention relates generally to interface devices within communication systems and more specifically to devices such as multiplexers and demultiplexers implemented within communication systems such as optical fiber communication systems.

BACKGROUND OF THE INVENTION

An integral part of any communication system is the protocol that is utilized to properly transmit the desired information from a first location to a second location. As an increasing amount of information is transmitted through optical fiber communication systems, numerous standard protocols have been established and more are currently being defined. These protocols utilize different rates and formats in order to balance the advantages of increased flexibility and services with the complexity and overhead that comes as a result.

For example, there are synchronous standards such as SONET in North America and SDH in Europe, numerous other continuous formats, and numerous burst formats. Burst formats do not have a continuous clock, but transmit bursts of data without requiring any given phase relationship between bursts. The phase of the clock in continuous formats has continuity under normal conditions.

For each of these protocols, transponders, regenerators, and multiplexer/demultiplexer systems have been developed for the particular bit rate and conditions that apply. These components are designed specifically for the particular protocol that it is to function with and cannot generally be used for other protocols.

To allow interfacing between systems that utilize different protocols, mapping devices have been developed to transfer data information within one protocol into a format that can be used within a system of a different protocol. The key to these mapping devices though are that they are specific to transferring one protocol into one other protocol and cannot generally be used with any protocols that they are not specifically hardwired for. For example, Bellcore Generic Requirement 0253 (GR-0253) describes in detail the standard mappings of the common asynchronous transmission formats (DS0, DS1, DS2, DS3, etc) into SONET. Similar mappings are defined for the ETSI hierarchy mapping into SDH.

The key to these mappings are that they are each very precisely tuned for the particular format and bit rate that is being mapped, plus or minus a tolerance such as 20 parts per million (ppm) on the bit rate. This means, that using these standard mappings, a signal that has a bit rate even 1% different than that of a DS3 format cannot be transported within a SONET system. A different hardware unit is generally required to perform the mapping of each kind of signal.

These limitations on standard mappings become even more pronounced when considering the use of a multiplexer that may have more than one protocol among the input signals and an output signal of yet another protocol. Similar problems can be seen with the use of a demultiplexer. Very specific multiplexers have been developed that perform multiplexing functions for a limited number of protocols. For instance, there is a multiplexer that can combine signals in the OC-3 and OC-12 formats to generate an output signal in the OC-48 format.

The key limitation to the current components used for multiplexing and demultiplexing is that a different piece of hardware is required for each different protocol or set of protocols that are to be combined. This is going to require a substantial number different mapping devices and protocol specific multiplexers/demultiplexers as the number of protocols continue to increase with new components being required with the advent of each new protocol.

SUMMARY OF THE INVENTION

The present invention is preferably a protocol independent multiplexer that allows for input signals of a variety of different bit rates to be received while outputting a single output with a bit rate that may be different than any of the received signals. This is performed by recovering data within the input signals, buffering the recovered data, and mapping the recovered data into a format sufficient for outputting. Preferably, the mapping is done by either a frame generation or a packet generation. In preferred embodiments, the buffering of the recovered data is controlled to ensure that the mapping is essentially continuous.

The present invention, according to a first broad aspect, is a multiplexer comprising two inputting devices, two buffering devices, and a mapping device. Each of the inputting devices operate to receive a data signal at a particular bit rate, recover data information within the received data signal with use of the particular bit rate, and output the data information. Each of the buffering devices are connected respectively to the inputting devices and operate to receive the recovered data information from its respective inputting device, save the data information, and output the recovered data information at determined outputting periods. The mapping device is connected to the buffering devices and operates to monitor a fill characteristic within each of the buffering devices, determine the outputting periods for each of the buffering devices with use of the corresponding fill characteristic, receive the data information output from each of the buffering devices, map the received data information into data units, and output the data units.

According to a further aspect, the present invention is similar to the multiplexer of the first aspect, but only has a single inputting device and single buffering device. This turns the device into an interface device between two protocols that possibly are not known.

The present invention, according to a second broad aspect, is a demultiplexer comprising an inputting device, two buffering devices, and two outputting devices. The inputting device operates to receive a data signal, recover data information within the received data signal, and output the data information. Each of the buffering devices is connected to the inputting device and operates to receive a portion of the recovered data information, save the recovered data information, and output the recovered data information at determined outputting periods. Each of the outputting devices is connected to the respective buffering device and operates to monitor a fill characteristic within the respective buffering device, determine the outputting periods for the respective buffering device with use of the corresponding fill characteristic, receive the data information output from the respective buffering device, and output the data information.

According to yet another aspect, the present invention is a protocol independent interface device that allows for the adding or dropping of data units, preferably data packets, by combining the multiplexer of the first broad aspect with the demultiplexer of the second b)road aspect.

Other aspects and features of the present; invention will become apparent to those ordinarily skilled in the art upon review of the following descriptions of specific embodiments of the invention in conjunction with the accompanying figures.

BRIEF DESCRIPTION OF TIE DRAWINGS

Preferred embodiments of the present invention are described with reference to the following figures, in which.

DETAILED DESCRIPTION OF THE PREFERRED EMBODIMENT

Figure 1:
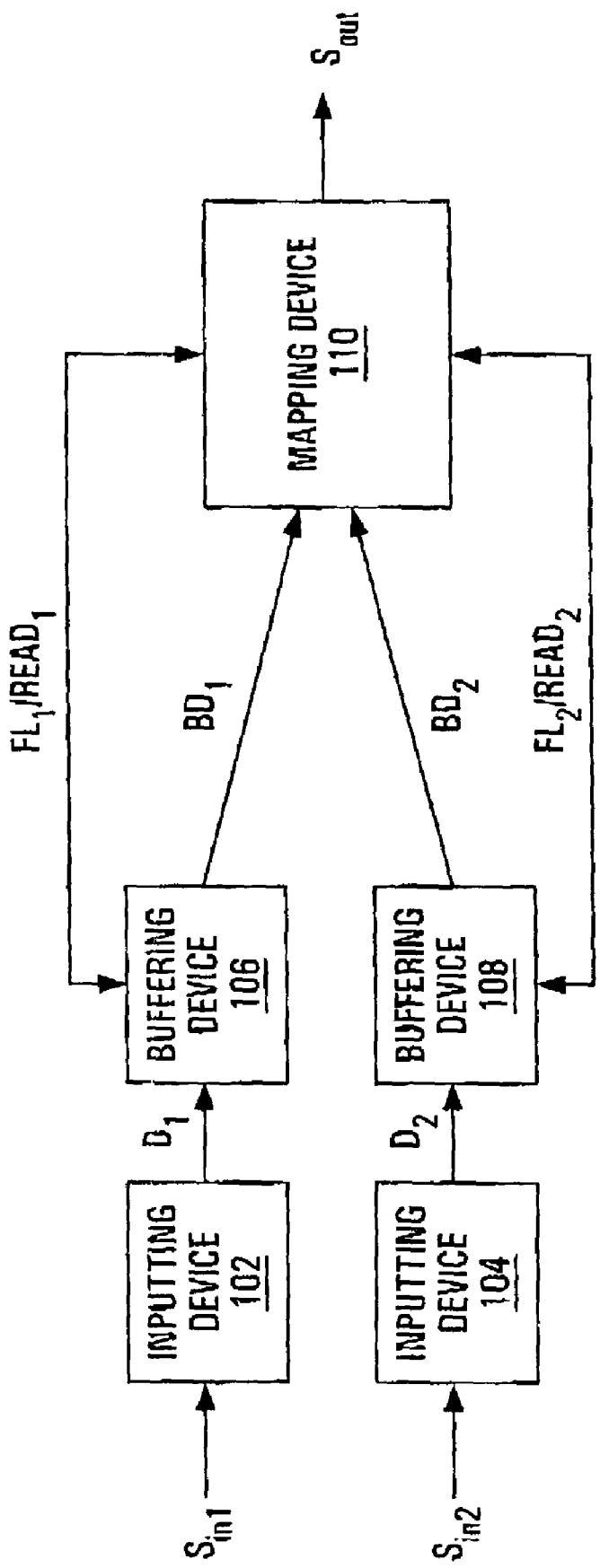
FIG. 1 is a block diagram of a protocol independent multiplexer according to a broad aspect of the present invention.

FIG. 1 illustrates a protocol independent multiplexer according to a broad aspect of the present invention. This multiplexer comprises first and second inputting devices 102, 104, first and second buffering devices 106,108 coupled to the first and second inputting devices 102,104 respectively, and a mapping device 110 coupled to the first and second buffering devices 106,108.

Each of the inputting devices 102,104 is: operable to receive a respective input signal $S_1,S_2$ which is defined by a particular protocol. The input signals are preferably optical input signals but it should be understood that they are-not limited to this; for instance, they could be electrical input signals. One skilled in the art would understand that each protocol may have a different: bit rate and hence, in previous implementations, require an inputting device designed specifically for that particular hit rate. According to a broad aspect of the present invention, the inputting devices 102,104 depicted within FIG. 1 are capable of being used for a plurality of different protocols that operate at a plurality of different bit rates. In some embodiments this is accomplished with the use of flexible inputting devices that can operate at a number of different fixed bit rates with software flags communicating to the inputting devices which of the fixed bit rates to be utilized in a particular circumstance. In preferred embodiments as are described herein below with reference to FIGS. 2 and 3, the inputting devices do not require software flags as they comprise Clock and Data Recovery (CDR) devices which, as will be described herein below with reference to FIGS. 4 and 5, can determine the bit rate of the respective received signals $S_{in1},S_{in2}$ and recover data information $D_1,D_2$ within the received signals with(out being given any knowledge of the actual protocol or bit rate that is used.

As depicted within FIG. 1, the first and second buffering devices 106,108 receive the data information $D_1,D_2$ output from the first and second inputting devices 102,104 respectively and output respective buffered data information $BD_1$, $BD_2$ to the mapping device 110 at outputting periods determined by the mapping device 110. Preferably, the percentages of the buffering devices 106,108 that are filled, hereinafter referred to as the fill levels (FL), are communicated to the mapping device. Subsequently, the mapping device 110 utilizes the fill levels $FL_1,FL_2$ to determine the outputting periods for the buffered data information $BD_1$, $BD_2$ from the buffering devices 106,108 and outputs read signals $READ_1,READ_2$ to the buffering devices 106,108. The utilization of the fill levels $FL_1,FL_2$ and the subsequent selection of outputting periods can be done in numerous ways, a few of which are described herein below during the description of the preferred embodiments.

Although the fill levels indicating the percentage of the buffering devices that are occupied with data information are utilized in the preferred embodiments, it should be recognized that any fill characteristic could be used. For instance, the fill characteristic could be a ratio between the data information saved within the particular buffering device that has not been output and a maximum amount possible to be saved within the particular buffering device.

The mapping device 110, after inputting the buffered data information $BD_1,BD_2$ from the buffering devices 106,108 maps this data information into data units consistent with a particular format. The format for a number of preferable data units are described herein below for the preferred embodiments though these are not meant to limit the scope of the present invention. The mapping device 110 then outputs these data units via an output signal $S_{out}$ which comprises the data information $D_1,D_2$ received by both the first and second inputting devices 102,104. Similar to the input signals $S_{in1}$, $S_{in2}$, the output signal is preferably an optical output signal, but is not limited to this embodiment.

Although the broad aspect of the present invention depicted within FIG. 1 only illustrates a multiplexer with two input signals $S_{in1},S_{in2}$, one skilled in the art would understand that a multiplexer according to the present invention could have more input signals as long as each input signal has a corresponding inputting device and a corresponding buffering device.

Further, although not shown within FIG. 1, a multiplexer according to the present invention could further comprise an outputting device coupled to the output of the mapping device 110 to transform the data units of the output signal $S_{out}$ into a particular format suitable for transmission.

Figure 2:
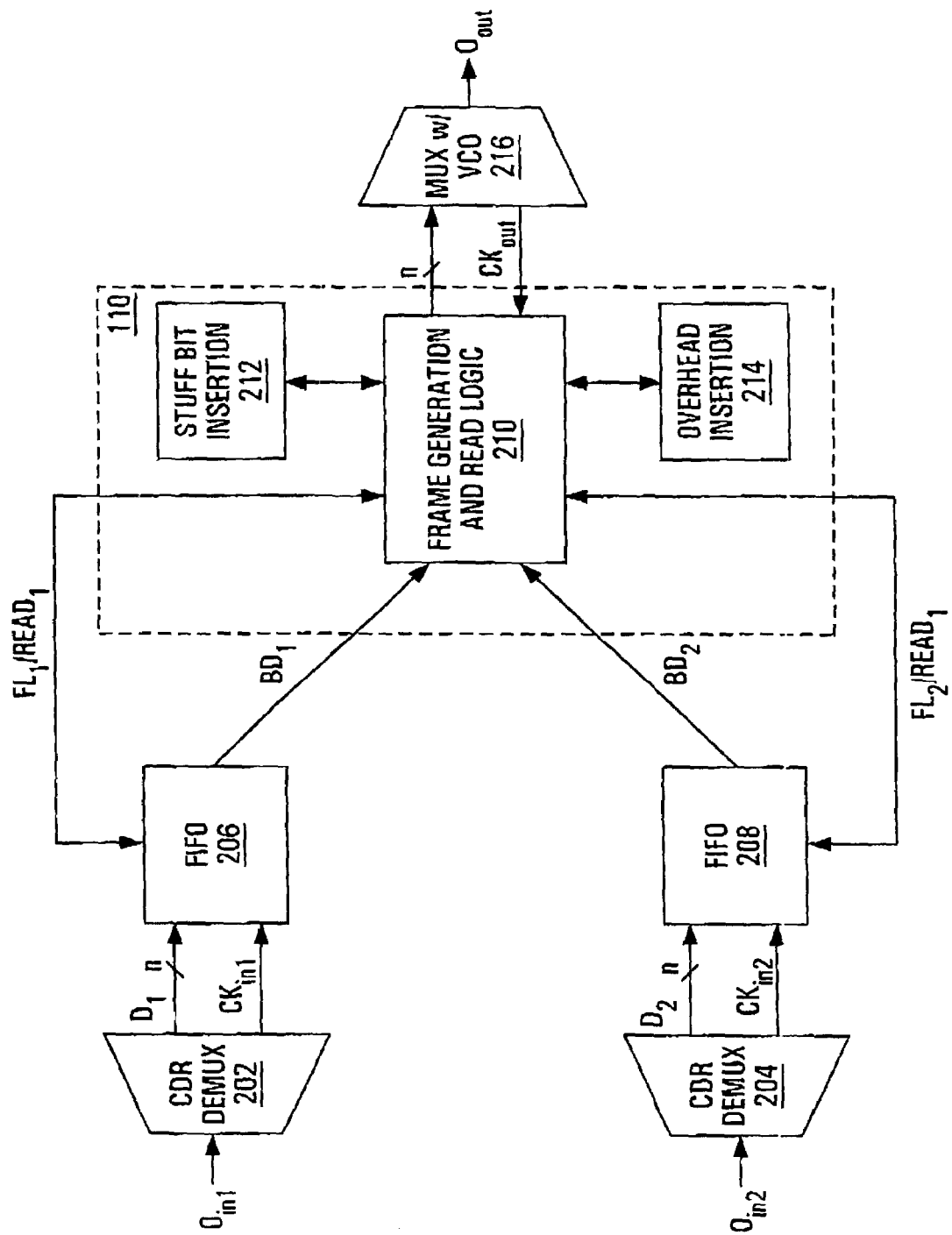
FIG. 2 is a block diagram of a protocol independent multiplexer according to a first preferred embodiment of the present invention.
Figure 3:
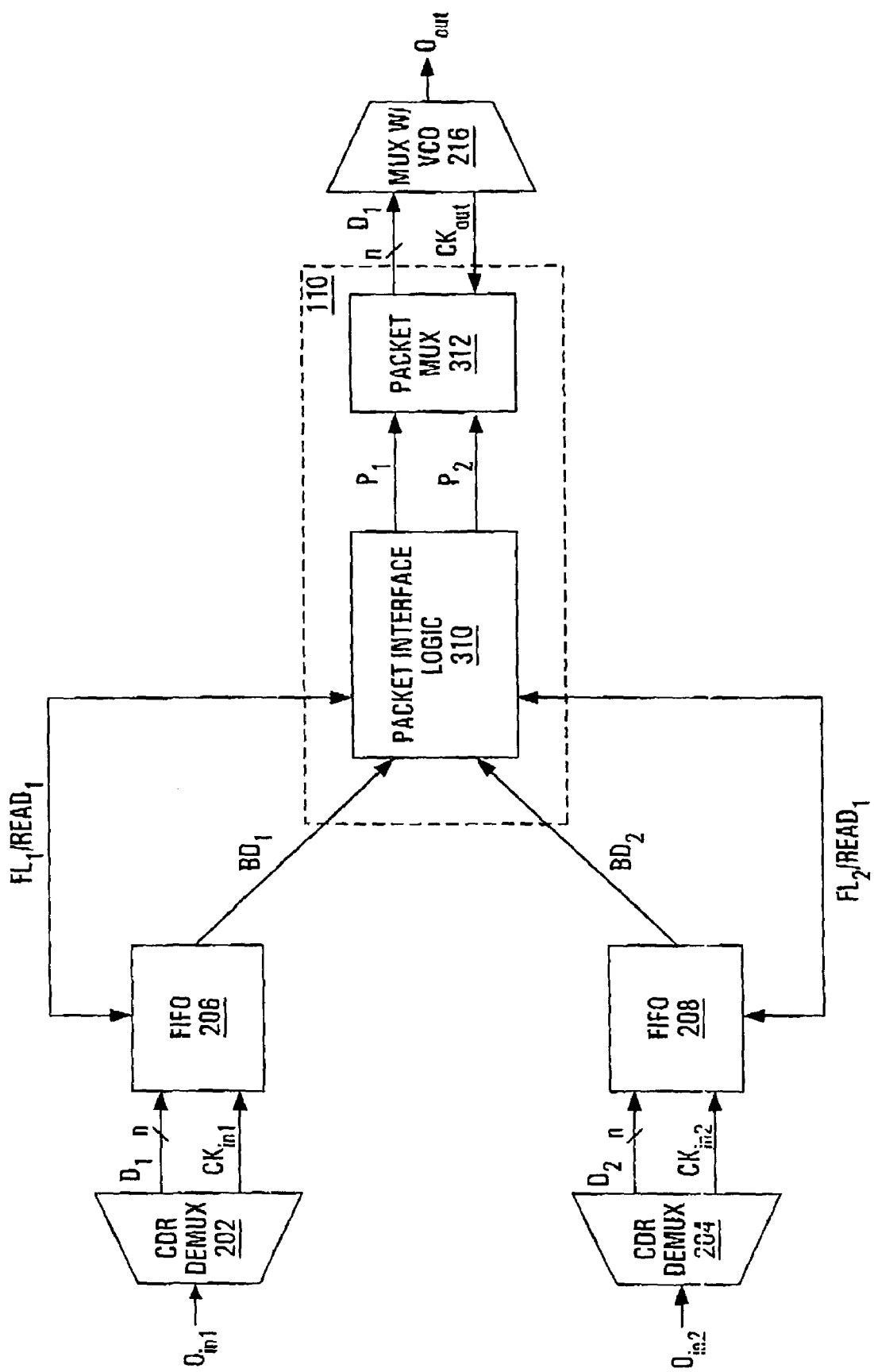
FIG. 3 is a block diagram of a protocol independent multiplexer according to a second preferred embodiment of the present invention.

The preferred embodiments of the present invention are now described with reference to FIGS. 2 through 8 for multiplexer/demultiplexer systems capable of being implemented within optical fiber communication systems. FIGS. 2 and 3 illustrate protocol independent multiplexers according to first and second preferred embodiments of the present invention. For these preferred embodiments, the inputting devices, as will be described in detail herein below with reference to FIGS. 4 and 5, are Clock and Data Recovery (CDR) devices combined with demultiplexers (DEMUX), hereinafter referred to as CDR DEMUX devices 202,204.

These CDR DEMUX devices 202,204 each receive respective optical input signals $O_{in1}, O_{in2}$, determine the clock rate of the received signal and hence its corresponding bit rate, recover the data information within the received signal, and output the respective clock rate $CK_{in1}, CK_{in2}$ that is synchronous with the respective optical input signals $O_{in1}, O_{in2}$ along with n signals that together are a demultiplexed version of the data information to the respective buffering device. In these preferable embodiments, the buffering devices are First-In-First-Out (FIFO) memory devices 206,208.

Figure 4:
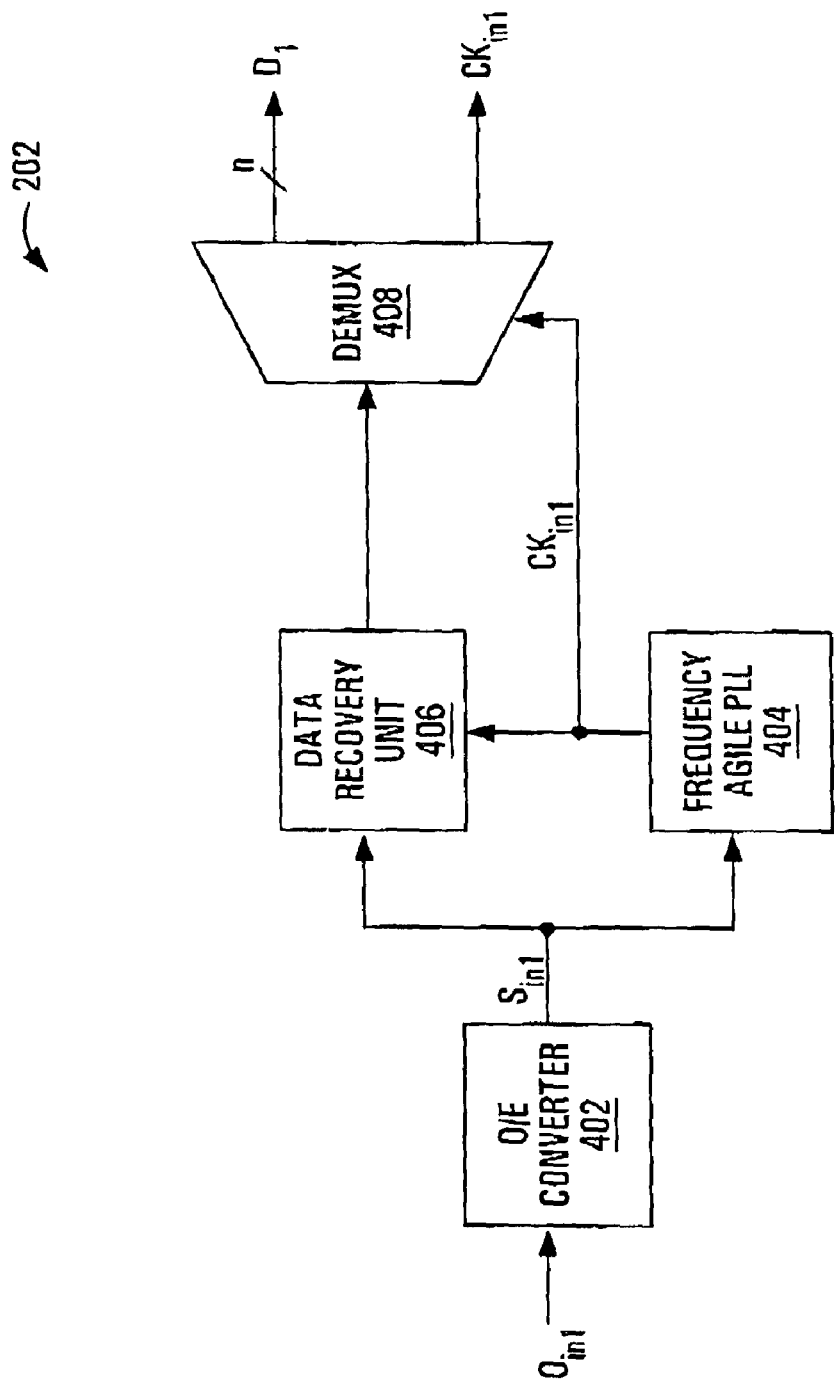
FIG. 4 is a block diagram of a Clock and Data Recovery (CDR) demultiplexer (DEMUX) device implemented in the multiplexer of FIGS. 2 and 3 according to an exemplary embodiment.
Figure 5:
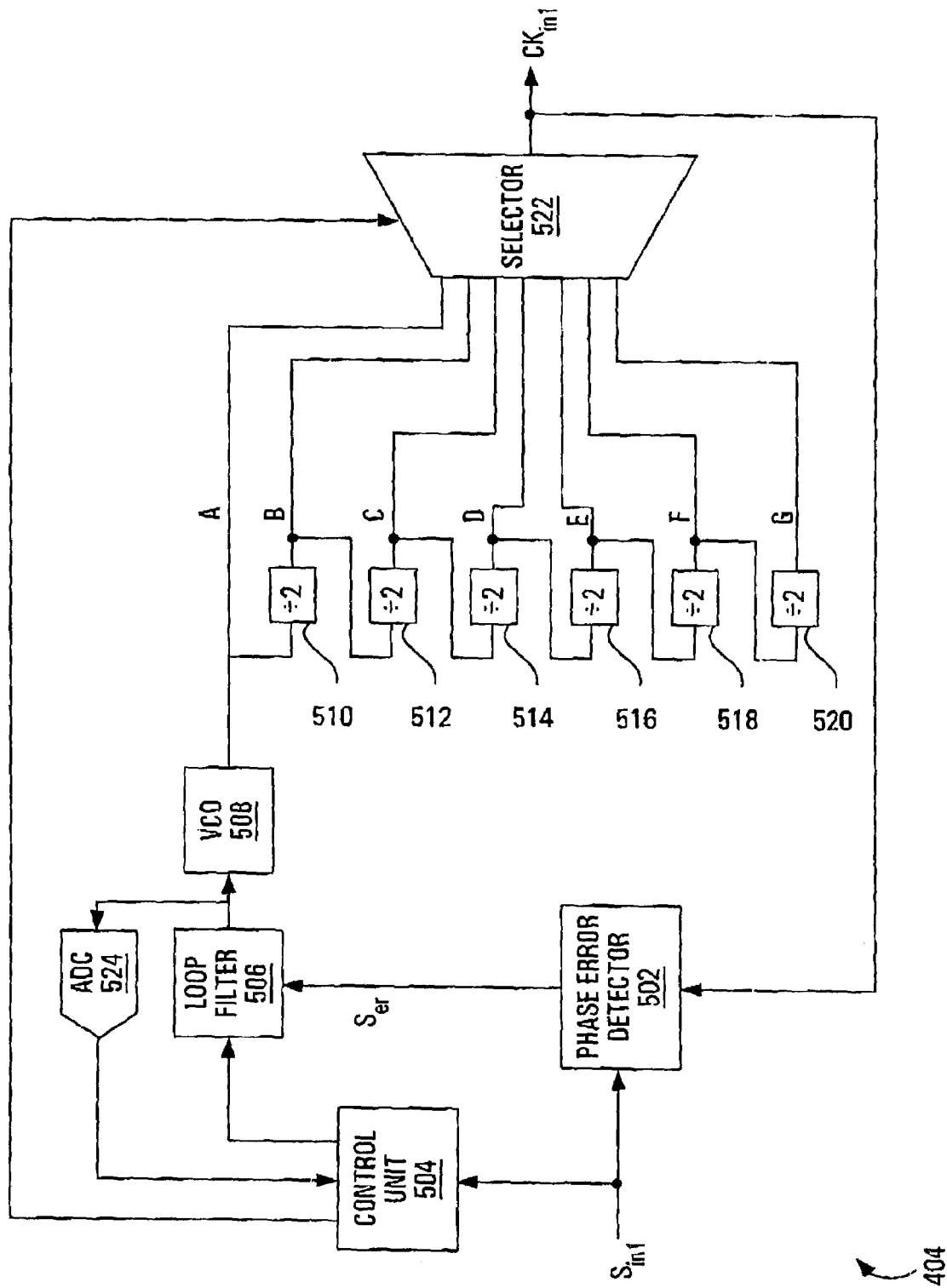
FIG. 5 is a block diagram of a frequency agile Phase-Locked-Loop (PLL) implemented in the CDR DEMUX device of FIG. 4 according to an exemplary embodiment.

FIG. 4 illustrates an exemplary version of the CDR DEMUX device 202 (that is also identical to the CDR DEMUX device 204) that comprises an Optical-to-Electrical (O/E) Converter 402, a frequency agile Phase-Locked-Loop (PLL) 404 coupled to the O/E converter 402, a data recovery unit 406 independently coupled to the O/E converter 402 and the frequency agile PLL 404, and a demultiplexer (DEMUX) 408 independently coupled to the frequency agile PLL 404 and the data recovery unit 406.

The O/E converter 402 operates to receive the optical signal $O_{in1}$ and convert it into an electrical signal $S_{in1}$ which is input to both the frequency agile PLL 404 and the data recovery unit 406. The frequency agile PLL 404, as will be described in detail herein below with reference to FIG. 4, determines the type of the received signal $S_{in1}$ and outputs the clock rate $CK_{in1}$ that corresponds to the received signal $S_{in1}$. The data recovery unit 406 utilizes the determined clock rate $CK_{in1}$ to recover the data information that was transmitted in the optical signal $O_{in1}$. The demultiplexer (DEMUX) 408 receives the data information output from the data recovery unit 406 and outputs n signals that together are a demultiplexed version of the data information. Further, the demultiplexer 408 forwards the clock rate $CK_{in1}$ determined at the frequency agile PLL 404.

The frequency agile PLL 404 is preferably similar to that disclosed within U.S. patent application Ser. No. 09/218,053 entitled "Apparatus and Method for Versatile Digital Communication" by Solheim et al, filed on Dec. 22, 1998, and assigned to the assignee of the present invention, herein incorporated by reference. This frequency agile PLL 404 is depicted within FIG. 5 and is designed to recover a clock of any frequency on a broad continuous range, from any type of digitally modulated signal. It should be understood that other designs for frequency agile PLLs are possible and FIG. 5 is provided to show one preferable embodiment.

The circuit comprises a phase error detector 502, a control unit 504, a loop filter 506 coupled to both the phase error detector 502 and the control unit 504, an octave Voltage Controlled Oscillator (VCO) 508 coupled to the loop filter 506, a plurality of clock dividers 510,512,514,516,518,520 coupled in series with the VCO 508, and a control selector 522 coupled to the VCO 508 and clock dividers 510-520. The selector 522 outputs the reference clock CK to be output from the PLL 404. The phase error detector 502 receives a demodulated digital signal $S_{in1}$ comprising the clock to be determined, and the reference clock CK output from the selector 522, detects a phase difference between these two signals and outputs the phase difference, or the phase error signal $S_{er}$ in a digital format. The signal is input to the loop filter 506 where the high frequency components are removed from the output in accordance with the low-pass characteristics of this filter 506.

The circuit preferably uses the octave VCO 508 in combination with the cascade of clock dividers 510-520. FIG. 4 shows six dividers-by-two used for the preferred embodiment, but the number of dividers is not limited to 6; more or less of them may be used, according to the frequency range necessary for a certain application.

Since the VCO 408 can span an octave of frequencies, and the reference clock output by the VCO 508 is divided in frequency by two, four, eight, sixteen, etc., any frequency can be generated at the outputs of the dividers 510-520. The selector 522 selects a frequency of interest as the recovered clock signal $CK_{in1}$. The selection can be done in hardware or in software.

The control unit 504 is used to set the programmable gains for the loop filter 506 and the control selector 522. The control unit 504 determines the input signal frequency of the signal $S_{in1}$ presented at the input of the PLL 404 in order to instruct the selector 522 to choose the value of interest for the recovered clock. The control unit preferably determines the input signal frequency by having a software cycle through the output from the dividers 510-520 from the highest divide ratio (G) to thee lowest divide ratio (A) until the PLL lock is obtained. Alternatively, a PLL lock detector could be implemented in hardware at the output of each divider 510-520. In this case, the lowest frequency that a lock is obtained will be the fundamental frequency of the signal $S_{in1}$.

An optional Analog-to-Digital Converter (ADC) 524 is shown which may be used to monitor the VCO control voltage to facilitate estimation of the bit-rate of the recovered clock.

The range of frequencies on which the ILL 404 may lock is much larger than one octave, the PLL 404 nevertheless requiring only an octave VCO 508. For example, VCO 508 may operate over the range 2.5 GHz±33%. The rate for STS-48 (SONET) or STM-16 (SDH) of 2488 MHZ is in this frequency range and would be available at input A, of selector 522. Input B in this case spans the frequency range 2.5 GHz÷2 ±33%, which is 1.25 GHz±33%. The SONET/SDH STS-24/STM-8 rate of 1244 MHz is on this frequency range and would be available at input B of selector 522. The SONET/SDH STS-12/STM-4 rate would be available at input C, etc. Very importantly, the PLL 404 may also be locked on other, non-SONET/SDH rates in these octave ranges. As examples, both 1062 MHZ (fiber channel) and 1600 MHZ (serial HIPPI) are frequencies on the range available at: input B of selector 522, while 565 MHZ (PDH) is a frequency on the range available at input C, and 44.736 MHZ (DS-3) is a frequency on the range available at input G of selector 522.

The PLL 404 bandwidth, K, is determined according to the following equation;

$$K = K_d K_o K_h / d^n$$

where $K_d$ is the gain of the phase error detector 502, $K_o$ is the VCO 508 gain, $K_h$ is the loop filter 406 gain, $d^n$ is the ratio for a divider n (e.g. 1, 2, 4, 8, 16, etc.), n ∈ [O,N], N is the number of dividers, and d is the ratio of all dividers, which is 2 in the example of FIG. 5. d was selected 2 in accordance with the use of an octave VCO.

Referring again to FIG. 4, it is recognized that the demultiplexer 408 is required within the CDR DEMUX devices 202,204 of this preferred embodiment in (order to allow the buffering devices (FIFO memory devices 206,208 in this case) and the mapping device 110 to be implemented in a technology such as Complementary Metal-Oxide Semiconductor (CMOS) which runs at a slower speed than the clock rate of the received signals $O_{in1}, O_{in2}$. If the buffering devices and mapping devices were implemented within a high-speed process technology that has a processing speed greater than or equal to the received signals $O_{in1}, O_{in2}$, the demultiplexer 408 may not be required. One possible high-speed process technology is Gallium-Arsenide (GaAs).

Referring again to the preferred embodiments of the protocol independent multiplexer depicted within FIGS. 2 and 3, the FIFO memory devices 206,208 communicate with the mapping device 110 the fill levels $FL_1,FL_2$ of the FIFO memory devices 206,208 and the mapping device 110 determines the outputting periods for the FIFO memory devices 206,208 with use of read signals $READ_1,READ_2$.

In the first preferred embodiment of the present invention depicted within FIG. 2, the mapping device 110 maps the buffered data information $BD_1,BD_2$ from the FIFO memory devices 206,208 into a frame structure. The mapping device 110, according to this first preferred embodiment, comprises a frame generation and read logic block. 210, a stuff bit insertion block 212, and an overhead insertion block 214.

The frame generation and read logic block 210 inputs the fill levels $FL_1,FL_2$ from the FIFO memory devices 206,208 and controls the outputting periods of the FIFO memory devices 206,208 with the corresponding read signals $READ_1$, $READ_2$. The key in this first preferred embodiment is that the fill level of the FIFO memory devices 206,208 be maintained substantially in the middle of the available memory with the devices 206,208. There are numerous different implementations for each individual frame though each will include at least one read cycle for each FIFO memory device 206,208, a number of stuff bits that may be grouped as stuff bytes inserted by the stuff bit insertion block 212, and an initial overhead (OH) portion inserted by the overhead insertion block 214. The OH portion preferably includes information required by a demultiplexer to operate properly such as information relating to the location of the stuff bits and to the bandwidth allocated to each input (the assignments of read cycles within a channel to particular FIFO memory devices 206,208, as is described herein below). Further, the OH portion may include other information such as parity bits.

One exemplary frame structure that could be utilized with the first preferred embodiment is now described with reference to FIG. 6. This particular frame structure comprises an overhead (OH) portion 602 and m frame channels 604 that each comprise N read cycles 606 and one or more stuff bits 608. The N read cycles 606 within a channel 604 preferably allow for a dynamic bandwidth allocation from the plurality of FIFO memory devices 206,208 by subdividing the transmission bit rate of the entire frame into N portions that are distributed among the FIFO memory devices 206,208. For example, if the frame is to be transmitted at 2.5 GHz and N is set at 16, then each read cycle allocated to a particular FIFO memory device 206,208 would constitute an allocation of 156.25 MHZ. Hence, the minimum bandwidth that can be allocated to a single FIFO memory device 206,208 would be that allocated for one read cycle (156.25 MHZ in the above example) and the maximum would be determined by the speed of the FIFO memory device 206,208 (hence, how many read cycles can be allocated to a particular FIFO memory device within a single channel). Preferably, the bandwidth within each frame for each FIFO memory device 206,208 is allocated based upon the fill levels $FL_1,FL_2$ for the particular FIFO memory devices 206,208 with left over bits within the frame being filled with stuff bits. In one embodiment a nominal stuff rate is utilized which directs there to be a set number of stuff bits at predetermined time intervals; this nominal rate being preferably adjustable based on the fill levels $FL_1,FL_2$ of the FIFO memory devices 206,208. In one exemplary embodiment, to adjust for differences in fill levels $FL_1,FL_2$ during a frame, stuff bits can be added or removed depending upon the need. It is noted that if a large number of stuff bits are groused together, there is a potential for jitter problems at the demultiplexer due to large time intervals between the arrival of data information.

The number (m) of frame cycles per frame on the other hand is determined by the efficiency that is requested. The efficiency ratio is determined by dividing the number of bits used for the channels by the number of bits used for the entire frame including the overhead (OH) portion 602. To increase the efficiency, the number of channels per frame can be increased or the number of read cycles per channel can be increased.

Figure 6:
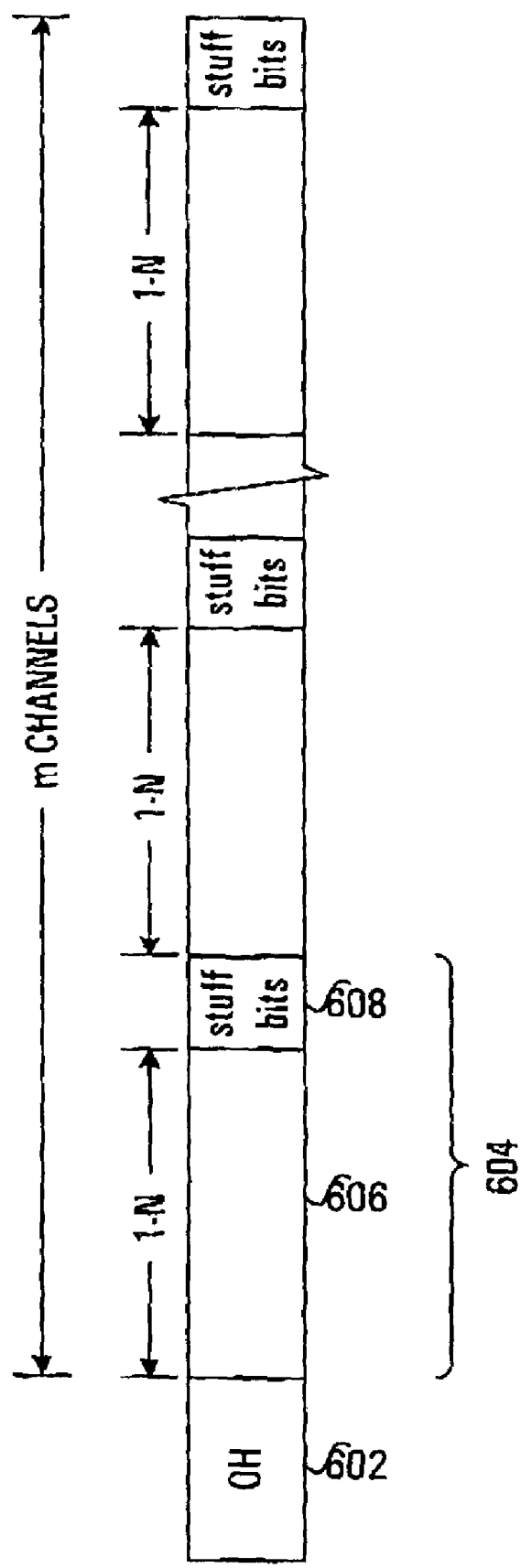
FIG. 6 illustrates an exemplary frame structure generated by the frame generation and read logic block implemented within FIG. 2.

Although the first preferred embodiment: is described with an exemplary frame structure as illustrated in FIG. 6, this is not meant to limit the scope of the present invention. There are numerous different frame structures that could operate with the first preferred embodiment depicted within FIG. 2 so that data information is read from the FIFO memory devices 206,208, a number of stuff bits or bytes is added to the frame, and an overhead (OH) portion is attached to the front of the frame. In fact, the first preferred embodiment would support any frame structure that would allow dynamic allocation of bandwidth to the individual FIFO memory devices 206,208 so that the fill levels of the FIFO memory devices 206,208 are maintained substantially-at a predetermined desired level or range such as 50% full.

Now referring to FIG. 3, the mapping device 110 according to the second preferred embodiment comprises a packet interface logic block 310 and a packet multiplexer (MUX) 312. In this second preferred embodiment, the packet interface logic block 310 is input with the fill levels $FL_1,FL_2$ of the FIFO memory devices 206,208 so that the block 310 can determine when there is sufficient data information to create a packet. Preferably, once it is determined that sufficient data information is buffered within one of the FIFO memory devices 206,208, the packet interface logic block 310 activates a read cycle with the corresponding read signal $READ_1,READ_2$ which triggers the outputting of the buffered data information $BD_1,BD_2$ within the particular FIFO memory device 206, 208. Preferably, the read rates is higher than the write rate and so the corresponding FIFO memory device 206,208 empties during the read cycle. The read cycle, according to the second preferred embodiment, is terminated once a predetermined low level of data information is buffered within the particular FIFO memory device 206,208 The packet interface logic block 310 further formats the data information into a standard packet format, preferably including a header and trailer, and forwards these packets $P_1,P_2$ corresponding to respective FIFO memory devices 206,208 to the packet MUX 312.

It is noted that, as depicted within FIG. 3, one packet interface logic block 310 is servicing a plurality of FIFO memory devices 206,208. This can only occur if the read rate is sufficiently high; otherwise, each FIFO memory device 206,208 should have a corresponding packet interface logic block 310.

The packet MUX 312 inserts the packets received from the packet interface logic block(s) 310 into a frame structure that can be used for transmitting. The unused bandwidth can be filled with idle packets. The packet MUX 312 further can be utilized to assign output ports and perform connection management and ADM functions. Although preferably the packet MUX 312 is a custom designed part, it is noted that an industry standard part may be utilized.

The next component in both the first and second preferred embodiments, as depicted within FIGS. 2 and 3, is a multiplexer (MUX) with VCO block 216 that corresponds to the outputting device mentioned above with reference to FIG. 1. This is preferably a well known component that receives portions of the frames in parallel at a first slow bit rate and multiplexes them at a clock rate ($CK_{out}$) that is sufficient to output the frames on an optical signal $O_{out}$ at a bit rate consistent with the optical fiber utilized. Preferably, this MUX with VCO block 216 is formatted to operate with SONET and so the output bit rate should be 2.5 GHz.

One key difference between the implementations of the first and second preferred embodiments is the read signals $READ_1, READ_2$. In the first preferred embodiment, the read signals $READ_1, READ_2$ are synchronous with the optical output signal $O_{out}$ of the multiplexer with gaps inserted for the OH portion and the stuff bits. On the other hand, the read signals $READ_1, READ_2$ within the second preferred embodiment of FIG. 3 are preferably asynchronous.

Demultiplexers that preferably operate with the multiplexers of the first and second preferred embodiments are now described with reference to FIGS. 7 and 8 respectively. The demultiplexer of FIG. 7 that operates with the multiplexer of the first preferred embodiment comprises a CDR DEMUX device 702, a frame removal and write logic block 704 coupled to the CDR DEMUX device 702, first and second FIFO memory devices 706,708 coupled independently to the frame removal and write logic block 704, and first and second MUX with VCO blocks 710,712 coupled independently to the FIFO memory devices 706,708.

The CDR DEMUX device 702 preferably operates to receive an optical signal $O_{in}$ from an optical fiber, demultiplex the received optical signal $O_{in}$ and output n signals that together comprises the received optical signal $O_{in}$.

The frame removal and write logic block 704 receives the demultiplexed signals from the CDR DEMUX device 702, recovers the frames from the demultiplexed signals n, and utilizes the overhead (OH) portions to determine the location of the stuff bits and to determine which read cycles were assigned to which FIFO memory device 206,208 (input signal $O_{in1}, O_{in2}$). After reading the overhead portion, the frame removal and write logic block 704 removes the overhead portion and the stuff bits and writes the data information contained within the channels to the appropriate FIFO memory device 706,708.

Preferably, the MUX with VCO blocks 710,712, at the same time, read data information out of the corresponding FIFO memory devices 706,708 and output the data via respective optical signals $O_{out1}, O_{out2}$ to optical fibers. Fill levels $FL_1, FL_2$ output from the FIFO memory devices 706, 708 are preferably used by the VCOs within the blocks 710, 712 to adjust the frequency of the VCOs in order to maintain the fill levels $FL_1, FL_2$ substantially at a predetermined desired level or range such as 50% full.

Figure 7:
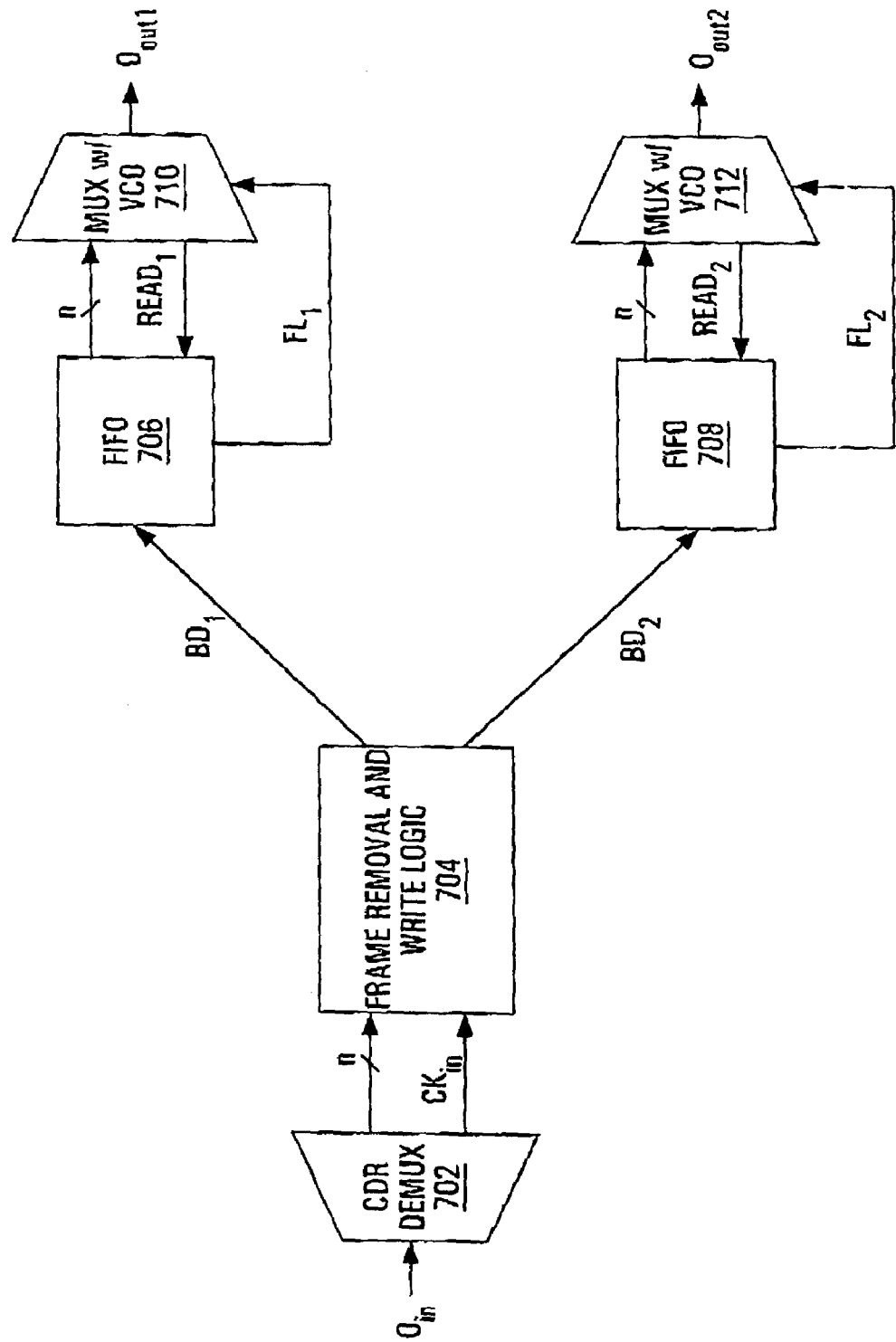
FIG. 7 is a block diagram of a protocol independent demultiplexer operable with the multiplexer of FIG. 2.
Figure 8:
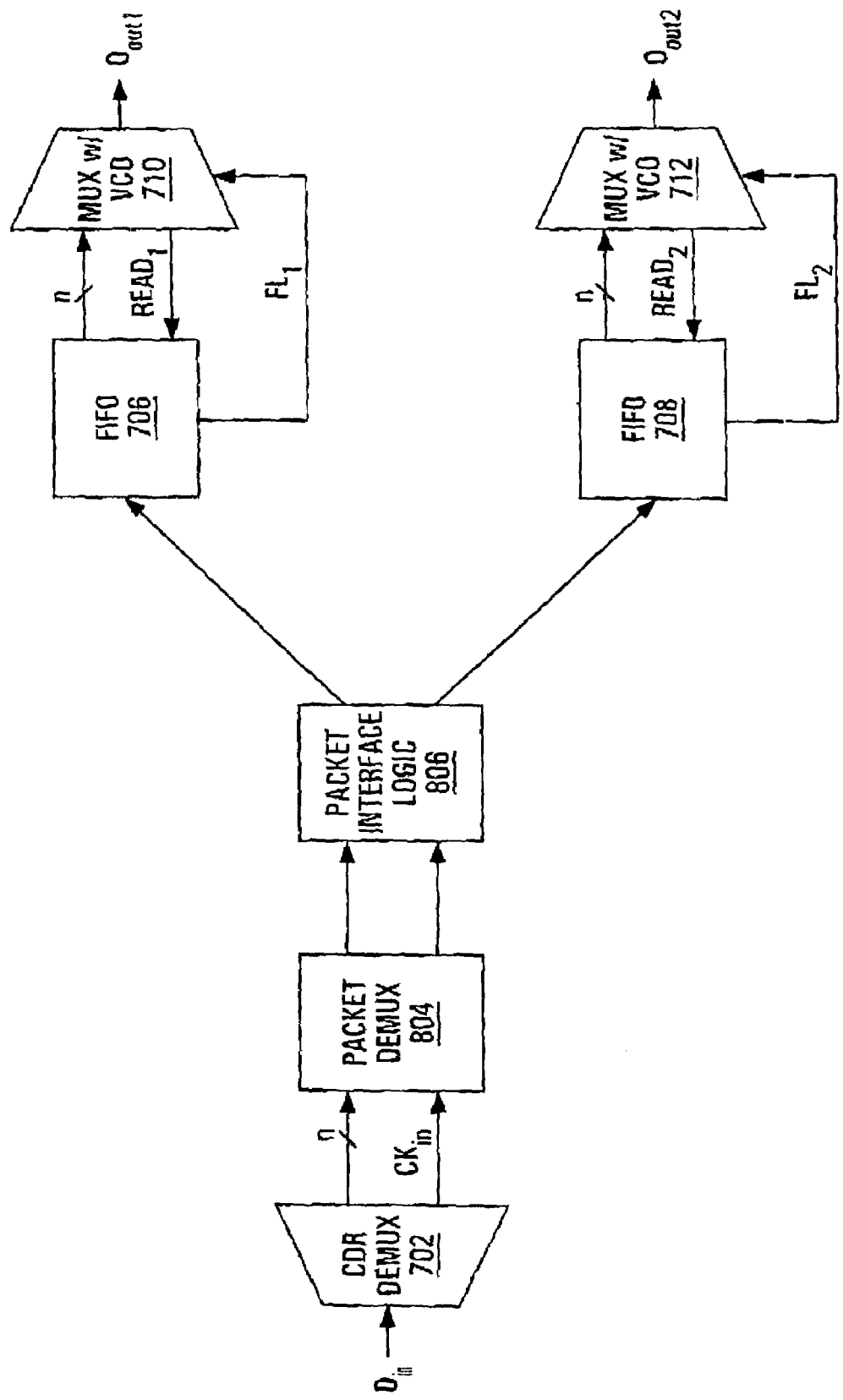
FIG. 8 is a block diagram of a protocol independent demultiplexer operable with the multiplexer of FIG. 3.

The demultiplexer of FIG. 8 that operates with the multiplexer of the second preferred embodiment is similar to that of FIG. 7, but replaces the frame removal and write logic block 704 with a packet demultiplexer (DEMUX) 804 coupled in series with a packet interface logic block 806. The packet DEMUX 804 recovers the packets that are sent via the incoming data stream output from the CDR DEMUX device 702 and forwards these packets to their assigned packet interface port within the packet interface logic block 806. The packet interface logic block 806 removes the data encapsulation (if any was required by the packet MUX 312) and writes the data information contained within the packets to the appropriate FIFO memory device 706,708. The remaining components of the demultiplexer depicted within FIG. 8 operate similarly to the components described previously for the demultiplexer of FIG. 7.

One key consideration that must be made concerning the demultiplexers of FIGS. 7 and 8 is the problem of output jitter on the output optical signals $O_{out1}, O_{out2}$. To reduce jitter, the bandwidth of the PLL must be sufficiently low to filter out variations in data arrival times. To reduce the probability of jitter problems many well-known techniques can be utilized such as increasing the amount of memory within the FIFO memory devices 706,708 to reduce periods in which the FIFO memory devices 706,708 are potentially empty.

Figure 9:
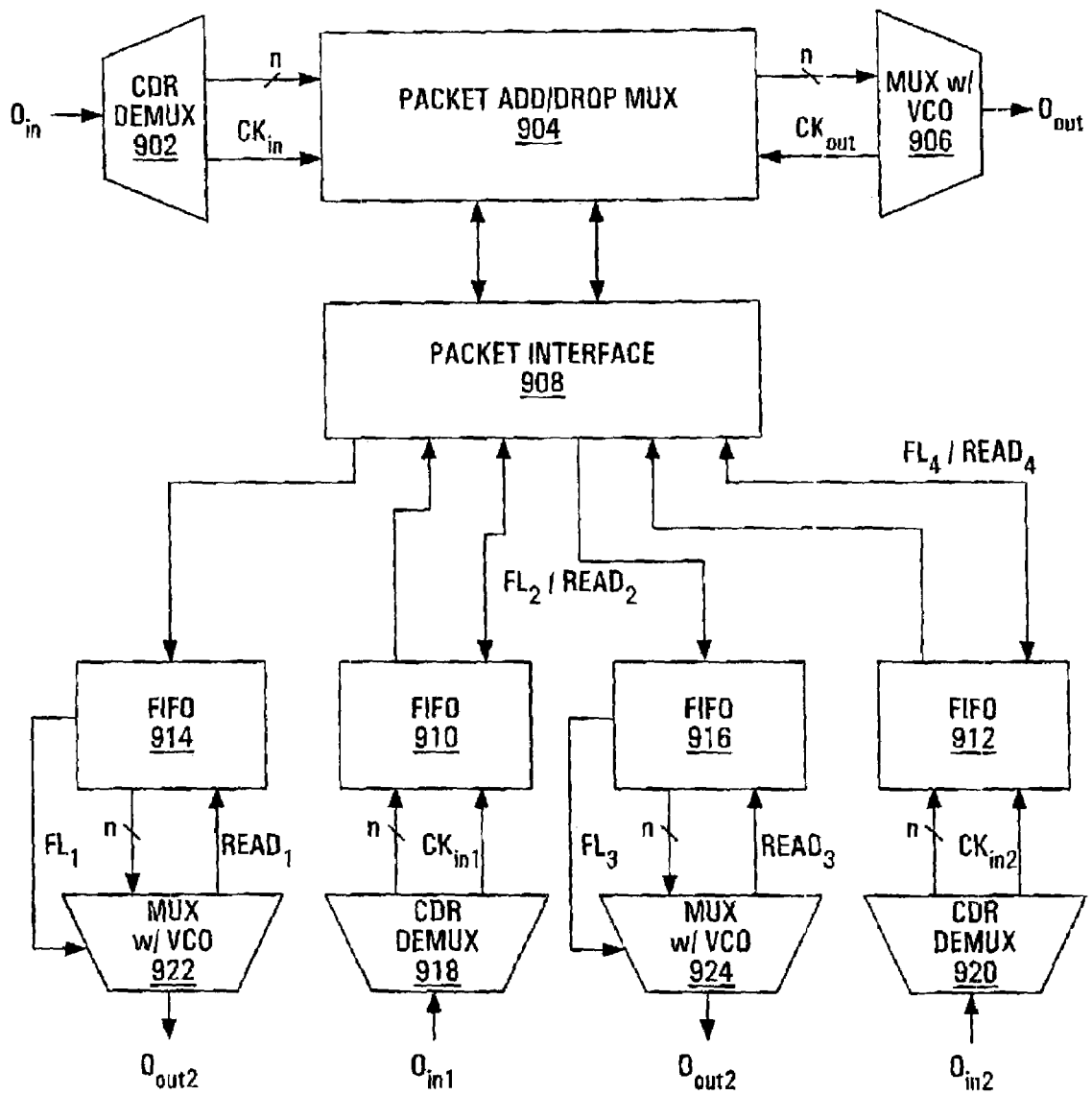
FIG. 9 is a block diagram of a protocol independent add/drop interface according to an alternative to the second preferred embodiment of the present invention.

An alternative embodiment of the present invention is now described with reference to FIG. 9 for an add/drop interface that combines the multiplexer and demultiplexer of the second preferred embodiment. This interface comprises a CDR DEMUX device 902 that is preferably the same as the CDR DEMUX device 702 coupled in series with a packet add/drop multiplexer (MUX) block 904 and a MUX with VCO block 906 that is preferably the same as the MAX with VCO block 216. Further, coupled to the packet add/drop MUX block 904 is a packet interface block 908 which has a plurality of inputting FIFO memory devices 910,912 and a plurality of outputting FIFO memory devices 914,916 attached. Each of the inputting FIFO memory devices 910,912 are further coupled to a respective CDR DEMUX device 918,920 and each of the outputting FIFO memory devices are further coupled to a respective MUX with VCO block 922,924.

The CDR DEMUX device 902 receives an Optical input signal $O_{in}$, determines the input clock rate $CK_{in}$ of the optical input signal $O_{in}$, and outputs the clock rate $CK_{in}$ and demultiplexed signals that together comprise thee optical input signal $O_{in}$. The packet add/drop MUX block 904 receives demultiplexed signals and the input clock rate $CK_{in}$ and determines, with use of packet headers, which packets should be forwarded onward through the MUX with VCO block 906 and which packets should be forwarded to the packet interface block 908 for processing at the interface. Further, the packet add/drop MUX block 904 receives other packets from the packet interface block 908 that are then also forwarded to the MUX with VCO block 906. The MUX with VCO block 906 operates as described for the MUX with VCO block 216, outputting an optical output signal $O_{out}$.

The packet interface block 908 operates similar to the combination of the packet interface logic block 310 and the packet interface logic block 806. The CDR DEMUX devices 918,920 along with the inputting FIFO memory devices 910, 912 operate the same as the similar components in FIGS. 2 and 3. The outputting FIFO memory devices 914,916 combined with the MUX with VCO blocks 922,924 operate the same as the similar components in FIGS. 7 and 8. Hence, the add function of this add/drop interface operates with optical input signals $O_{in1}, O_{in2}$ received at the CDR DEMUX devices 918,920 being forwarded through the inputting FIFO memory devices 910,912, converted into packets within the packet interface block 908, and forwarded through the packet add/drop MUX 904 and the MUX with VCO block 906 to the optical output signal $O_{out}$. Similarly, the drop function operates as packets are forwarded to the packet interface block 908 from the packet add/drop MUX block 904. The packets are then reformatted and forwarded via the outputting FIFO memory devices 914,916 to the respective MUX with VCO blocks 922,924 where data information within the dropped packets can be output in corresponding optical output signals $O_{out1}, O_{out2}$.

There are numerous advantages to both the first and second preferred embodiments of the present invention The second preferred embodiment can leverage industry investment in packet MUX technology, such as implemented within packet MUX block 312, to provide additional functionality. Further, the packet based solution provides simplification over the first preferred embodiment since there is no need to provision the bandwidth of any given input port, as the packet MUX block 312 automatically accommodates for variations in the input rate. Yet further, the granularity of the bandwidth allocation is improved for the packet based solution compared to the frame generation and bit stuffing solution. In the packet based solution, the bandwidth allocation for each input port is only limited by the defined packet size while the frame generation and bit stuffing solution is limited by the divide ratio of the number of read cycles by the rate the frame is to be transmitted at. In addition, the packet based solution of the second preferred embodiment has the possibility of added value by enabling add/drop functionality as described in the alternative embodiment of FIG. 9, by combining the protocol independent multiplexing of the present invention with switched Ethernet interfaces on the same wavelength, and/or by allowing compatibility with existing packet based networks for transmission over existing Internet Protocol (IP) or Asynchronous Transfer Mode (ATM) infrastructures.

On the other hand, the frame generation and bit stuffing solution of the first preferred embodiment is simpler if a packet MUX block is not already available. Further, the packet based solution has a larger potential of having jitter problems at the demultiplexer due to the time interval between transmissions of data information. Yet further, the overhead portion utilized in the first preferred embodiment can provide additional benefits such as internode communication channels, the ability to monitor and/or correct bit errors, signaling for protection signaling and fault isolation, and end to end connection verification. If the frame format defined is compatible with pre-existing standards, the frame generation and bit stuffing solution could allow for the multiplexed signal to be carried over existing networks such as SONET networks.

In either case, the key advantages to the present invention are the ability of the present invention to multiplex signals without the knowledge of the protocols to be utilized being known at the time of implementation and the ability of the multiplexer to dynamically allocate bandwidth to the various input signals. The first key advantage allows a single piece of hardware to be used with a multitude of different protocols, therefore not requiring large inventories of numerous different multiplexers and demultiplexers that are specific to a limited number of protocols. As well, the use of the present invention could reduce the number of service visits that would be required to replace hardware when new protocols are introduced and could increase the time to market of new services as no hardware changes would be required to carry the new service over the network.

The ability to dynamically allocate bandwidth to the various input signals allows better utilization of the bandwidth within a channel with unknown bit rates, hereinafter referred to as a transparent channel. This improved efficiency reduces the cost of implementing transparent services that utilize transparent channels. Further, the dynamic bandwidth allocation allows for increased flexibility for the combining of a single high bandwidth service with a plurality of low bandwidth services which have a minimal incremental cost.

Although the preferred embodiments have, been described in detail herein above, this is not meant to limit the scope of the-present invention. For instance, the "trib" functions, such as the CDR DEMUX devices 202,204 and FIFO memory devices 206,208 within the multiplexers and the FIFO memory devices 706,708 and MUX with VCO blocks 710, 712 within the demultiplexers, could be implemented on separate cards from the remaining components. This enables separate protection of these "trib" components and allow for sub-equipping of "trib" components for lower initial costs.

Another limitation of the preferred embodiments that is not meant to limit the scope of the present invention is the described use of either frames in the first preferred embodiment and packets in the second preferred embodiment. In fact, the mapping device can map the data information input from the buttering devices into any data unit that is defined for, as long as the receiving of data information is done based upon the fill characteristic.

Although the multiplexers of the preferred embodiments have been illustrated in FIGS. 2 and 3 as having only two input optical signals $O_{in1}, O_{in2}$, one skilled in the art would understand that the multiplexers could be implemented with more optical signals as long as each optical signal had a corresponding inputting device 104 and buffering device 106. Similar, expansions on FIGS. 7, 8, and 9 could be contemplated.

Further, although the preferred embodiments of the present invention are directed to multiplexers and demultiplexers, it can be seen that the multiplexer of FIG. 2 or 3 can be reduced to a single input optical signal. In this case, only a single inputting device 102 and a single buffering device 106 would be required. Hence, rather than operating as a multiplexer, the modified device would operate as an interface device between two protocols, the bit rate of the input optical signal either being detected by a CDR DEMUX device or being indicated through a software flag. In this implementation, the interface device would comprise an inputting device, a buffering device, a mapping device, and preferably an outputting device.

Persons skilled in the art will appreciate that there are yet more alternative implementations and modifications possible to provide a protocol independent multiplexer and/or demultiplexer, and that the above implementations are only illustrations of these embodiments of the invention. The scope of the invention, therefore, is only to be limited by the claims appended hereto.

The invention claimed is:

1. A multiplexer comprising:
   at least two inputting devices, each configured to receive data signals having any of a plurality of nominal bit rates and any of a plurality of protocols, to determine a nominal bit rate for a received data signal from said received data signal, to determine from the determined nominal bit rate a protocol for said received data signal, to recover data information within the received data signals, and to output the data information;
   buffering devices connected respectively to the inputting devices, each buffering device being configured to receive the recovered data information from its respective inputting device, to save the data information, and to output the recovered data information at determined outputting periods;
   a mapping device connected to the buffering devices and configured to monitor a fill characteristic within each of the buffering devices, to determine the outputting periods for each of the buffering devices using the corresponding fill characteristic, to receive the data information output from each of the buffering devices to map the received data information into data units, and to output the data units.

2. A multiplexer as defined in claim 1, wherein:
   each inputting device is configured to recover a clock signal from the received data signal and is configured to determine the nominal bit rate for the received data signal from the recovered clock signal.

3. A multiplexer according to claim 1, wherein:

the fill characteristic indicates the amount of the capacity of the buffering device currently occupied by the data information saved within the buffering device that has not been output.

4. A multiplexer according to claim 3, wherein:

the mapping device determines the outputting periods for a buffering device so as to maintain the buffering device approximately half full.

5. A multiplexer according to claim 1, wherein:

the mapping device is a frame generation device and the mapping of the received data information into data units comprises the step of generating a plurality of frames;

each of the frames comprise an overhead portion and a plurality of data sections, each of the data sections comprising the data information received from one of the buffering devices during one of the outputting periods; and the overhead portion comprises information required to remove the frame structure from the data information.

6. A multiplexer according to claim 5, wherein:

the mapping device operates to determine the outputting periods for each of the buffering devices by allocating each of the buffering devices a set number of the outputting periods in each of the frames.

7. A multiplexer according to claim 6, wherein:

the set number is determined dynamically for each frame based upon the fill characteristics of the buffering devices.

8. A multiplexer according to claim 5, wherein:

each of the frames further comprise at least one stuff bit that fills up unused space within the particular frame and the overhead portion further comprises information required to remove the stuff bits.

9. A multiplexer according to claim 8, wherein:

the stuff bits are dynamically allocated within each of the frames based upon the fill characteristics of the buffering devices.

10. A multiplexer according to claim 1, wherein:

the mapping device is a packet generation device and the mapping of the received data information into data units comprises the step of generating a plurality of packets; wherein each of the packets comprise a header portion and at least one data section, the data section comprising the data information received from one of the buffering devices during one of the outputting periods.

11. A multiplexer according to claim 10, wherein:

the fill characteristics are measures of the amount of saved data information within each of the buffering devices; and the mapping device determines the outputting periods for one of the buffering devices by determining when the respective amount of saved data information within the buffering device is sufficient to fill the data section of one of the packets.

* * * * *

UNITED STATES PATENT AND TRADEMARK OFFICE
CERTIFICATE OF CORRECTION

PATENT NO.       : 7,590,153 B2
APPLICATION NO. : 10/349939
DATED            : September 15, 2009
INVENTOR(S)      : Solheim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1834 days.

Signed and Sealed this

Twenty-first Day of September, 2010

David J. Kappos
*Director of the United States Patent and Trademark Office*